US005122967A

United States Patent [19]

Gilham

[11] Patent Number: 5,122,967

[45] Date of Patent: Jun. 16, 1992

[54] POSTAGE STAMP AND DISPENSING SYSTEM THEREFOR

[75] Inventor: Dennis T. Gilham, Brentwood, United Kingdom

[73] Assignee: Alcatel Business Systems Limited, Isle of Man

[21] Appl. No.: 457,366

[22] Filed: Dec. 27, 1989

[30] Foreign Application Priority Data

Dec. 30, 1988 [GB] United Kingdom ................ 8830422

[51] Int. Cl.[5] .............................................. G06F 15/20

[52] U.S. Cl. .............................. 364/479; 364/464.02; 221/71

[58] Field of Search ................... 364/479, 464.02, 200; 221/13, 25, 70, 71, 9; 226/46, 135, 9

[56] References Cited

U.S. PATENT DOCUMENTS

| | | | |
|---|---|---|---|
| 2,970,536 | 2/1961 | Bach | 101/227 |
| 3,655,109 | 4/1972 | Stevens | 226/46 |
| 3,780,310 | 12/1973 | Hudler | 250/555 |
| 4,008,792 | 2/1977 | Levasseur et al. | 194/217 |
| 4,180,856 | 12/1979 | Check, Jr. et al. | 364/466 |
| 4,443,697 | 4/1984 | Ryan et al. | 194/212 |
| 4,568,950 | 2/1986 | Ross et al. | 101/93.04 |
| 4,579,213 | 4/1986 | Rhine et al. | 364/479 |
| 4,637,523 | 1/1987 | Levasseur | 221/13 |
| 4,653,009 | 3/1987 | Brown | 364/479 |
| 4,873,645 | 10/1989 | Hunter et al. | 364/479 |
| 4,958,782 | 9/1990 | Dannatt et al. | 242/75.43 |
| 4,970,655 | 11/1990 | Winn et al. | 364/479 |

FOREIGN PATENT DOCUMENTS

| | | |
|---|---|---|
| 0165601 | 12/1985 | European Pat. Off. . |
| 0172561 | 2/1986 | European Pat. Off. . |
| 0199333 | 10/1986 | European Pat. Off. . |
| 0202486 | 11/1986 | European Pat. Off. . |
| 1000250 | 8/1965 | United Kingdom . |
| 1102603 | 2/1968 | United Kingdom . |
| 1371382 | 10/1974 | United Kingdom . |
| 1392706 | 4/1975 | United Kingdom . |

*Primary Examiner*—Jerry Smith
*Assistant Examiner*—Paul Gordon
*Attorney, Agent, or Firm*—Shoemaker and Mattare, Ltd.

[57] ABSTRACT

A postage stamp dispenser receives a cassette of postage tape which has marks along its length representing postage value. When a stamp is to be dispensed, the dispenser feeds a length of tape corresponding to the required postage value and prints information such as the postage value and date on the tape. The dispenser may mark the tape with a fuorescent stripe to assist cancellation equipment to locate the stamp. The tape is provided in lengths of known value and the dispenser may provide an indication of thhe value of tape remaining unused in the cassette.

9 Claims, 2 Drawing Sheets

POSTAGE STAMP AND DISPENSING SYSTEM THEREFOR

BACKGROUND OF THE INVENTION

This invention relates to machines for issuing postage stamps and in particular to machines in which stamps of any selected value can be issued.

In order to overcome disadvantages of purchasing postage stamps from a postal authority for use in mailing items, franking machines which print a postal frank indicating payment of a postage charge on the item are used by business users of the mailing system. However due to the need for security in the construction and operation of such franking machines, the machines tend to be relatively expensive and accordingly are not used by small business users. Consequently small business users are constrained to purchase and use stamps issued by the postal authority. As a result, it is necessary for a user to keep a stock of a number of different values of stamps in order to ensure that the correct value of stamps are available for application to items of various different weights. Also when the postal rates change, values which were commonly used are little used and can only be used, if the postal rates have increased in conjunction with additional stamps. Postal stamps are difficult to keep safely and recording the use of such stamps has to be carried out manually.

SUMMARY OF THE INVENTION

According to one aspect of the invention a stamp dispensing system including dispensing apparatus; postage tape receivable by said dispensing apparatus; said tape having a physical characteristic corresponding to postage value; said dispensing apparatus including means to feed said postage tape and issue a portion of said tape constituting a postage stamp from said dispensing apparatus and control means operable to control the feeding means to issue a stamp of selected value, the physical characteristic of that portion of tape issued as a stamp being indicative of the postage value of the stamp.

Preferably the dispensing apparatus includes printing means to print at least a representation of the postage value on the tape.

According to other aspects the invention embraces dispensing apparatus for use in the stamp dispensing system defined hereinbefore and embraces a postage tape and a cassette of postage tape for use in stamp dispensing apparatus as defined hereinbefore.

BRIEF DESCRIPTION OF THE DRAWING

A postage stamp and a dispenser therefor comprising a postage stamp dispensing system in accordance with the invention will now be described by way of example with reference to the drawings in which.

DESCRIPTION OF THE PREFERRED EMBODIMENT

Figure 1A:
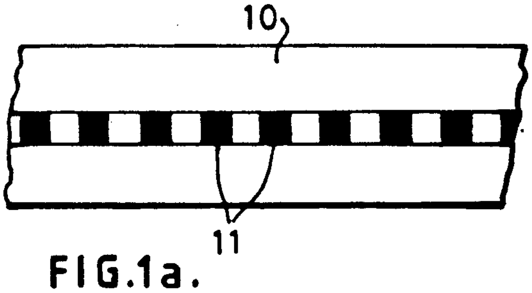
FIG. 1*a* shows a length of postage tape prior to printing.

A preferred form of postage stamp dispensing system comprises a cassette containing postage tape and a dispenser machine to receive the cassette and operable to print postage stamp information on the postage tape and then dispense the printed portion of tape. The cassette houses a length of postage tape which is thermally sensitive to permit printing thereon by a thermal print head. The cassettes may house a single standard predetermined length of postage tape corresponding to a single total value of postage but it is preferred to provide cassettes with selected different lengths of postage tape and to provide the cassette with means identifying the length of postage tape and hence the total postage value of the tape housed therein. The postage tape may be self adhesive or have a coating of moistenable gum on its reverse face. As shown in FIG. 1*a*, the postage tape 10 is pre-faced with a track of marks 11 extending along the length of the tape to represent postage value. The marks extend along the centre of the tape as shown but if desired may extend adjacent an edge of the tape 10. Instead of a track of marks, the tape may have some other physical characteristic which represents postage value.

Figure 2:
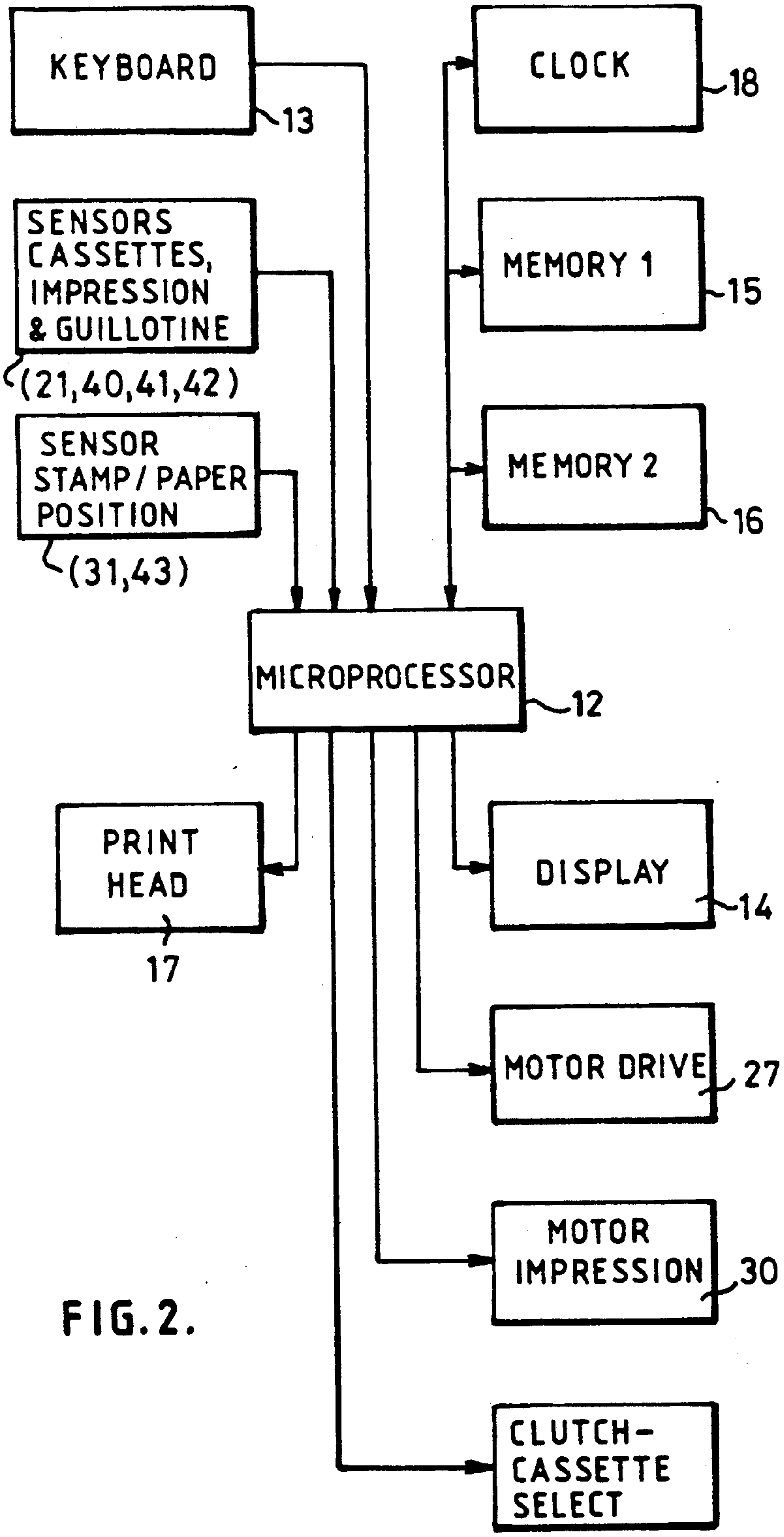
FIG. 2 is a block diagram of the electronic circuitry of a dispenser.

The dispenser machine to dispense postage stamps from the postage tape in the cassette is of simple construction and as shown the block electronic circuit diagram of FIG. 2 includes a micro-processor 12 to control operation of the dispenser and is provided with a keyboard 13 for input of postage charge values and control signals by a user and a display 14 such as a liquid crystal device to display the value entered on the keyboard and if desired dispenser status and user prompt information to the user. The dispenser includes memories 15, 16 of which at least memory 15 is non-volatile and is utilised to store information relating to usage of the dispenser including monetary value of postage tape remaining in the cassette. A thermal print head 17 is provided to print on the postage tape under the control of print signals from the micro-processor 12. The information to be printed may include both fixed and variable data. Fixed information would include the Postal Authority logo authorised for use on such postage tape and the variable information would include value of the postage stamp, the date and information which may be entered by means of the keyboard relating to post codes and special services. The dispenser includes a clock 18 maintained by a battery which inputs date information to the micro-processor for output to the printer to print the current date on the stamp being issued. The program routines for operation of the micro-processor are stored in a non-volatile or read only memory 15 or 16. Fixed data to be printed may also be stored in this memory.

Figure 3:
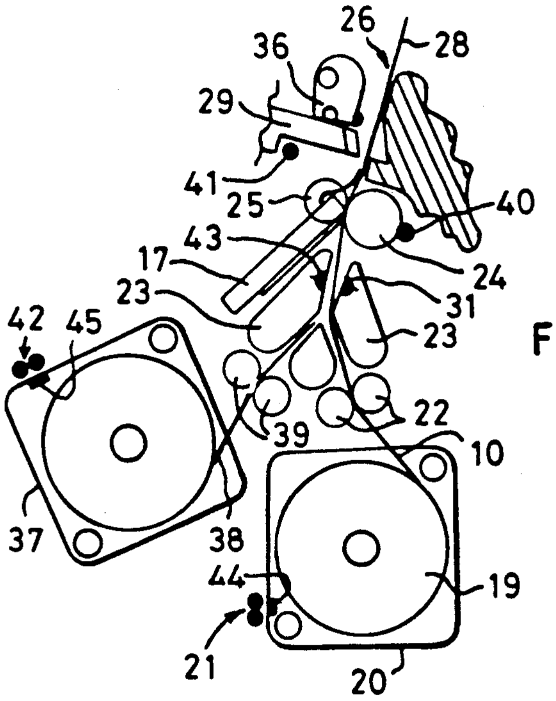
FIG. 3 illustrates the mechanical arrangement of the dispenser during printing of a postage stamp and FIG. 4 is similar to FIG. 3 after printing is complete and illustrates operation of a guillotine to sever the printed stamp.
Figure 4:
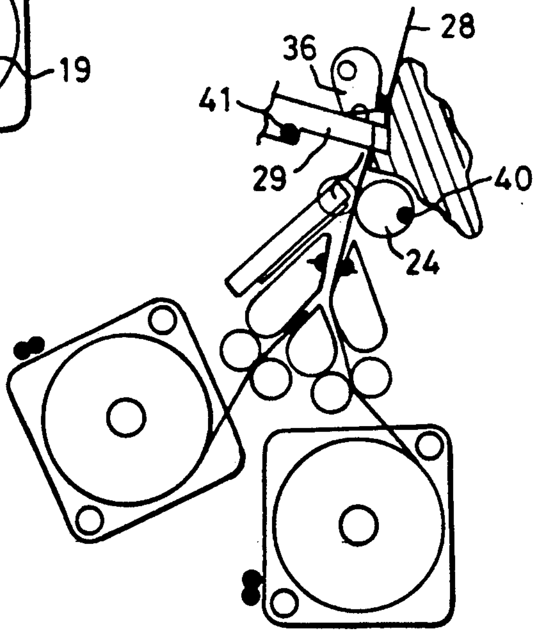

FIGS. 3 and 4 illustrate the mechanical arrangement of the components of a postage stamp dispensing system. A reel 19 of postage tape 10 is housed in a cassette 20. The dispenser includes means 21 to sense that a cassette 20 containing postage tape is positioned in the dispenser and, if cassettes containing different lengths of postage tape are to be accommodated, the dispenser includes means 21 operative to sense an indication 44 on the cassette which relates to the length of postage tape housed in the cassette. The indication on the cassette may consist of a marking on the cassette body or may be provided by a physical characteristic of the body, for example one or more apertures in a wall of the body of the cassette. A pair of feed rollers 22 feed the tape 10 from the cassette between guides 23 to the print head 17. An impression roller 24 urges the tape 10 into engagement with the print head and together with feed rollers 25 located on each side of the print head feeds the tape past the print head to an exit 26 from the dispenser. A motor drive 27 comprising an electric motor, which may be a D.C motor or a stepper motor, operated under the control of the microprocessor 12 drives the impression roller 24 and also drives the pair of feed rollers 22 by means of a first clutch selectively operated under the control of the microprocessor to feed the postage tape 10 from the cassette past the print head 17 and to the exit 26 so as to issue a stamp 28 (see FIG. 1*b*) carrying the marks 11 and printed by the print head from the dispenser. A guillotine 29 is provided to sever the issued stamp 28 from the remainder of the postage tape 10. The guillotine may be manually operated by a user when prompted by a prompt sign shown by the display or may be operated automatically by the microprocessor when issue of the printed stamp is completed. Preferably an interlock is provided to prevent operation of the guillotine until issue of the stamp is complete. After issue of the stamp 28 the impression roller 24 is moved away from the print head 17 and feed rollers 25 by a motor drive 30 controlled by the microprocessor and the motor drive 27 is energised in reverse to withdraw the postage tape 10 and draw back the free end of the tape so that the free end lies between the guides 23. The tape is then ready for feeding to the print head for printing the next stamp. The energisation of the motor drive 27 is controlled by sensing of the marks 11 on the tape 10 by a sensor 31. This sensing of the marks is utilised to control start of printing of data on the postage stamp by the print head, the length of tape fed past the print head to the exit 26 and to control operation of the guillotine 29. In addition, after printing of a stamp and issue thereof, when the tape is withdrawn from the print head the sensor detects the passing of the free end of the tape to terminate the reverse energisation of the motor drive 27.

Figure 1B:
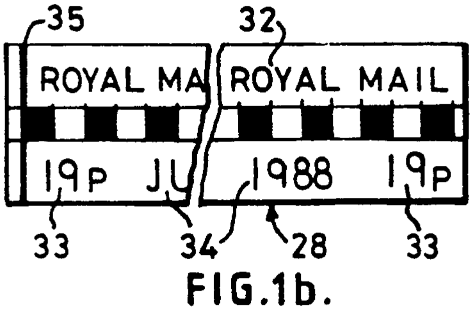
FIG. 1*b* shows a printed postage stamp.

In use of the dispenser, a cassette containing postage tape is inserted in the dispenser and the presence of the cassette and the monetary value indicated by the means on the cassette of the length of postage tape within the cassette is sensed by the sensing means of the dispenser. The monetary value of the tape is written to the non-volatile memory 15. The user enters a required value of postage by means of the keyboard 13 and if required a control key to initiate a stamp printing operation. The motor drive 27 is energised under control of the microprocessor 12 to feed a length of tape 10 corresponding to the postage charge past the print head 17 to enable printing on the tape of the Post Office logo 32, the value of postage charge 33 and the date 34 as is shown in FIG. 1*b*. Each mark represents one unit of postage charge, for example one penny, and hence in order to issue a stamp of say 19 pence value the motor drive 27 is energised so that the postage tape fed past the print head has a length with 19 marks spaced along the track. The marks may be in the form of circular dots or may be rectangular areas. The pitch of the marks may be approximately 1 mm. Thus the portion of the tape issued as a stamp 28 is of a length corresponding to the value printed and bears a printed visual indication of the postal value and, in addition bears, along a track, a representation of the value which can be easily read by reading equipment in the Post Office. After printing of the stamp 28 is complete, the energisation of the motor drive 27 is continued for a sufficient time to feed the stamp 28 out from the dispenser. The guillotine 29 is operated to detach the stamp from the remaining tape and the motor drive 27 is energised to drive the tape in reverse to rewind the tape and draw the free end of the tape back. Sensors 40 and 41 are provided to detect the states of the impression roller and the guillotine respectively.

The micro-processor decrements the value of the tape sensed from the cassette by an amount equal to the value of the postage stamp printed by the thermal print head for each issue of a stamp. By operation of an appropriate control key, the user may ascertain the value of tape remaining in the cassette at any time. The dispenser may include a register in the memory designated to store a value equal to the total value of postage stamps issued by the dispenser.

It will be appreciated that prior to carrying out a stamp printing operation to print a stamp of value indicated by an input by means of the keyboard, the microprocessor reads the contents of the memory 15 to ascertain that there is a sufficient monetary value and length of tape to effect printing of the stamp. If the length of tape remaining in the cassette is insufficient for the desired value of stamp, printing is inhibited and a prompt to the user is displaced by the display. An override facility may be provided to enable the end of the tape to be issued followed by an issue from a replacement new cassette for the remainder of the value of the required postage amount.

In addition to the postage tape cassette, the dispenser may be constructed to receive a second cassette 37 housing a strip of paper 38 which can be fed past the print head 17, at times when the dispenser is not being used to dispense postage stamps, to print data relating to usage of the dispenser and other pre-defined information, for example 'first class mail' and 'airmail' as required by the user. A second pair of feed rollers 39 is provided to feed the paper strip from the cassette 37 between the guides 23 to the print head 17 and impression roller 24. The pair of feed rollers 39 are driven by the motor drive 27 by means of a second clutch selectively actuable by the microprocessor. Thus when it is desired to print on the paper strip 38 the motor drive 27 is operated as described hereinbefore in respect of printing and issuing a stamp but the second clutch of the motor drive is actuated instead of the first clutch. After the required printing has been effected and the printed portion has been severed from the remainder of the strip by operation of the guillotine, the paper strip is withdrawn by reverse drive of the pair of feed rollers 39. The dispenser is provided with a further sensor 42 to detect the presence of the second cassette and a sensor 43 to detect position of the paper strip. Generally, if the second cassette houses a paper tape only for the purpose of providing a printout of data, the sensor is not required to sense the length of paper tape in the cassette. However it may be convenient to permit a postage tape cassette to be received in either location of the dispenser. Accordingly if this is required, the sensor 42 is the same as the sensor 21 and senses both the presence of the cassette and the indication 45 of length of postage tape in the cassette. If postage tape cassettes are receivable in either location of the dispenser, the sensors 21 and 42, or some other means, provide an indication to the microprocessor of which location is being used currently for dispensing postage tape.

While data to be input to the dispenser may be entered by means of the keyboard, the dispenser may be provided with a reading head to enable data such as postal rates to be input from a card or the like carrying such data in dispenser readable form.

It will be appreciated that the marks 11 on the postage tape are provided in a secure manner in order to prevent or deter production of unauthorised forgeries of the postage tape. The marks may be formed as magnetic, optical or holographic recordings on a stripe of suitable material on the postage tape. In order to prevent re-use of the stamps issued by the dispenser, the Post Office would pass mail items bearing the stamps through a device to effect cancellation of the stamps. One form of secure holographic recording and erasure thereof is described in Eureka, Sep. 1983 pages 37, 38. To assist cancellation equipment of the Post Office to locate the stamp on the mail items, the tape may be marked, for example, with a fluorescent stripe 35 by inking means 36. The inking means 36 is preferably mechanically coupled with the guillotine 29 so that upon operation of the guillotine to sever the stamp, the inking means engages the stamp adjacent the trailing end thereof thereby ensuring that the stripe is located at a predetermined position relative to the end of the stamp.

Thus it will be understood that the stamp dispensing system enables a user to purchase a cassette of tape of selected monetary value and to dispense stamps of any desired value from the cassette until there is no or insufficient tape remaining in the cassette. In addition the dispenser maintains a record of usage of the dispenser and the user can operate the dispenser to issue a printed record of use of the dispenser.

While a postage stamp dispensing system using a postage tape housed in a cassette has been described hereinbefore it will be appreciated that although it is convenient and it is preferred to provide the tape in a cassette it is not necessary that the tape should be in a cassette. The postage tape could be supplied as an open reel which is inserted in a receptacle in the dispenser. In this case, the postage value of the tape would be entered by the user by means of the keyboard or could be recorded on a leader or packaging of the tape in a form readable by a reader included in the dispenser.

It is considered to be desirable to provide a control in respect of the minimum and maximum values of postage stamp which can be issued by the dispenser. Stamps of very small value would be of such short length that they would be difficult to handle and stamps of very high value may well be of such a long length as to be difficult or impossible to accommodate upon a mail item. Accordingly the microprocessor would be programmed to check, prior to printing and issue of a postage stamp, that the value entered by the user by means of the keyboard of stamp required lies within predetermined upper and lower limits.

The marks 11 need not be visible on the face of the stamp and, provided that they are readable by the Postal Authority equipment, the marks may be provided within the thickness of the tape or on the reverse face of the tape.

I claim:

1. A stamp dispensing system for dispensing stamps having selected ones of a plurality of postage values including dispensing apparatus and a postage tape for dispensing by said dispensing apparatus;

said postage tape comprising an elongate strip bearing a track of marks wherein the pitch of said marks represents a unit of postal value;

said dispensing apparatus comprising:

a supply of said postage tape;

means to feed said postage tape from said supply;

means to sense said track of marks during feeding of said tape by said feeding means;

postage selection means to select a desired value of postage to be represented by a stamp;

control means responsive to sensing of said marks by said sensing means and said postage selection means to control said feeding means to dispense a stamp comprising a portion of said tape bearing a number of said marks, the number of said marks corresponding to said selected value of postage; and printing means controlled by said control means to print postage data relating to said desired value of postage on said portion of tape.

2. A stamp dispensing system as claimed in claim 1 wherein the supply of postage tape includes indicator means indicative of an initial length of postage tape in said supply; and wherein the dispensing apparatus includes sensing means responsive to said indicator means; a memory; means responsive to said sensing means to write a value in said memory corresponding to said initial length of tape indicated by said indicator means and operative in response to dispensing of each stamp to decrement said value by an amount corresponding to the desired value of postage represented by the dispensed stamp and to write a resultant decremented value in said memory corresponding to a current length of postage tape currently available for dispensing by the dispensing apparatus.

3. A stamp dispensing system as claimed in claim 2 wherein the control means is operative in response to said means to select a desired value of postage to compare said desired value of postage with the decremented value stored in the memory and to control the feeding means to feed the tape only if the desired value of postage is equal to or less than said decremented value.

4. A stamp dispensing system as claimed in claim 2 wherein the tape supply comprises a cassette housing the postage tape and removably mounted in the dispensing apparatus.

5. A stamp dispensing system for dispensing stamps successively from a postage tape, each said stamp being of any selected one of a plurality of different postage values comprising:

a supply of postage tape bearing a track of marks at constant pitch along the length of said postage tape; and dispensing apparatus;

said dispensing apparatus including sensing means to sense said marks;

printing means for printing on said tape; severing means to sever a portion of tape from said supply of tape;

means to enter a selected value of stamp to be issued by said dispensing apparatus;

feeding means to feed tape from said supply sequentially past said sensing means said printing means and said severing means;

control means operative in resposne to the entered selected value and to said sensing means to control said feeding means to feed a portion of said tape past the printing means, said portion of tape being of length such that the number of said marks thereon represent said selected value and to control said printing means to print postage information including said selected value on said portion of tape; said control means being further operative to control feeding of the tape to an extent that only said portion of tape passes said severing means and to operate said severing means to sever said portion of tape from said supply of tape.

6. A stamp dispensing system as claimed in claim 5 wherein the control means is operative subsequent to operation of the severing means to control the feeding means to feed said tape in a reverse direction until a free end thereof from which the portion was severed is in a retracted position sensed by the sensing means.

7. A stamp dispensing system as claimed in claim 6 including a supply of paper strip and means to feed said paper strip past the printing means and the severing means and wherein the control means is operable to control said mean to feed said paper strip when the free end of the postage tape is in the retracted position and to control said printing means to print data relating to usage of the dispensing means on said paper strip.

8. A stamp dispensing system for dispensing stamps having selected ones of a plurality of postage values including dispensing apparatus and a postage tape for dispensing by said dispensing apparatus;

said postage tape comprising an imperforate elongate strip bearing a track of marks wherein the pitch of said marks represents a unit of postal value;

said dispensing apparatus comprising;

a supply of said postage tape;

means to feed said postage tape from said supply;

means to sense said track of marks during feeding of said tape by said feeding means;

postage selection means to select a desired value of postage to be represented by a stamp;

control means responsive to sensing of said marks by said sensing means and to said postage selection means to control said feeding means to dispense a unitary indivisible stamp comprising a portion of said tape bearing a number of said marks, the number of said marks corresponding to said selected value of postage; and printing means controlled by said control means to print postage data relating to said desired value of postage on said portion of tape.

9. A stamp dispensing system for dispensing stamps having selected ones of a plurality of postage values in a succession of dispensing operations including dispensing apparatus and a postage tape for dispensing by said dispensing apparatus;

said postage tape comprising an imperforate elongate strip bearing a track of marks wherein the pitch of said marks represents a unit of postal value;

said dispensing apparatus comprising:

a supply of said postage tape;

means to feed said postage tape from said supply;

means to sense said track of marks during feeding of said tape by said feeding means;

postage selection means operable to select a desired value of postage to be represented by a unitary indivisible stamp;

control means responsive to sensing of said marks by said sensing means and to said postage selection means to control said feeding means to dispense said unitary indivisible stamp comprising a portion of said tape bearing a number of said marks, the number of said marks corresponding to said selected value of postage; and printing means controlled by said control means to print postage data relating to said desired value of postage on said unitary indivisible stamp comprising said portion of postage tape;

said dispensing apparatus being operable in a first dispensing operation of the succession in response to said postage selection means selecting a first postage value to dispense a first unitary indivisible stamp comprising a first length of postage tape bearing a first number of said marks corresponding to said first postage value and postage data printed by said printing means corresponding to said first postage value and in a second dispensing operation of the succession in response to said postage selection means selecting a second postage value different from said first postage value to dispense a second unitary indivisible stamp comprising a second length of postage tape bearing a second number of said marks corresponding to said second postage value and postage data printed by said printing means corresponding to said second postage value.

* * * * *